Jan. 6, 1931.                E. H. BURKE                 1,787,893
                       WINDSHIELD WIPER SUPPORT
                         Filed May 15, 1929
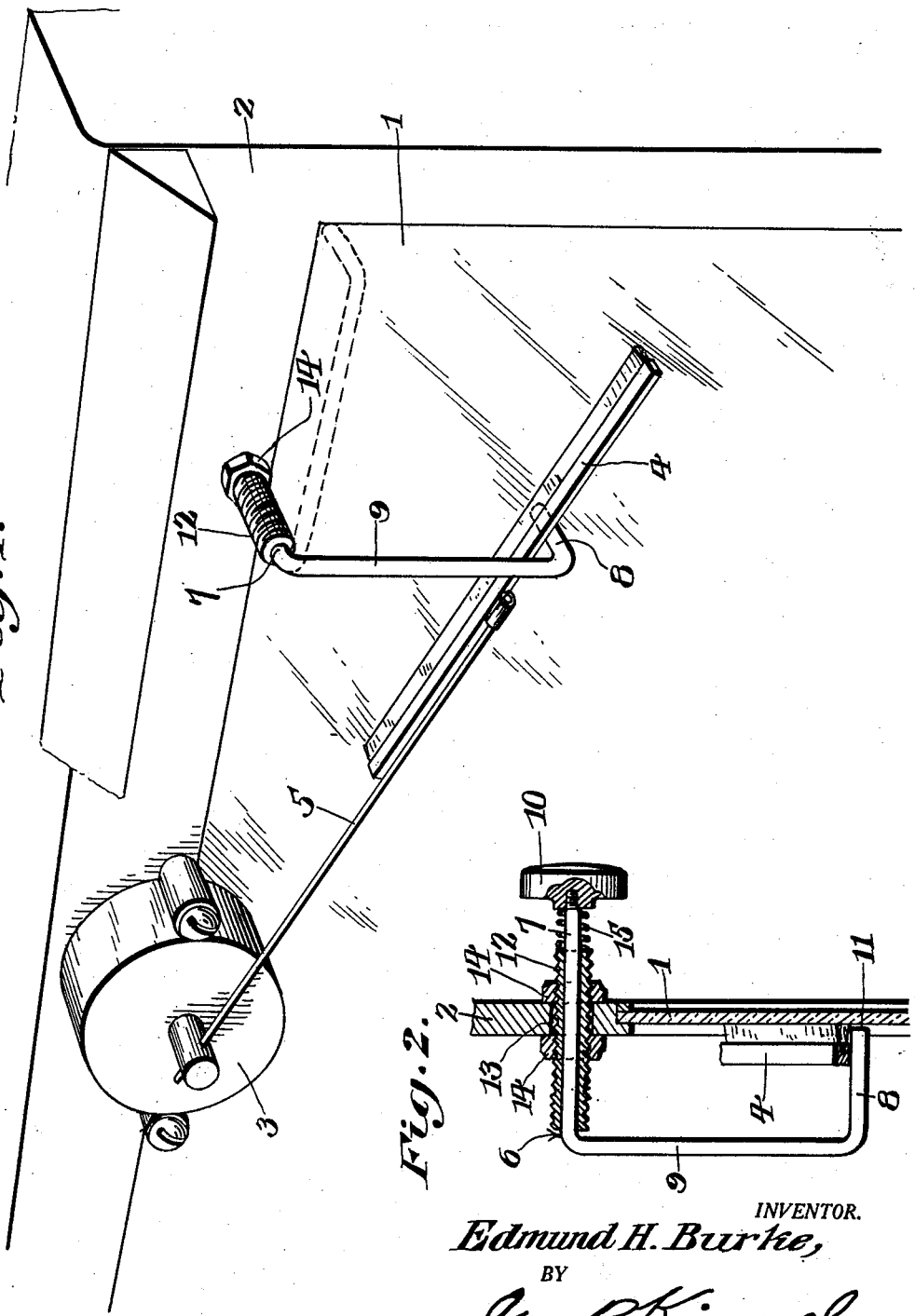
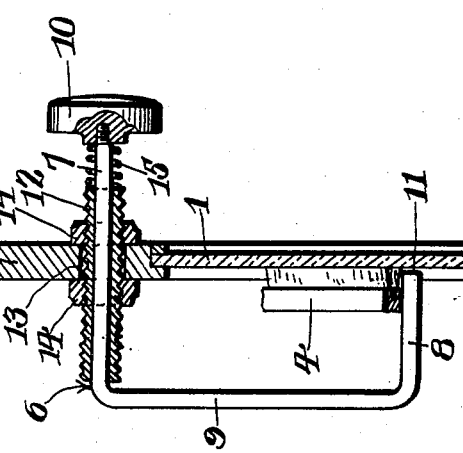
INVENTOR.
Edmund H. Burke,
BY
Geo. P. Kimmel.
ATTORNEY.

Patented Jan. 6, 1931

1,787,893

UNITED STATES PATENT OFFICE

EDMUND H. BURKE, OF NORMAN, OKLAHOMA

WINDSHIELD-WIPER SUPPORT

Application filed May 15, 1929. Serial No. 363,383.

This invention relates to a windshield wiper support and has for its primary object to provide, in a manner as hereinafter set forth, a device of such class by means of which a windshield wiper may be securely held adjacent the top of the windshield during such period that the wiper is not in active operation, thereby preventing the wiper from dropping into the line of vision of the driver of the vehicle with which the device is associated.

A further object of the invention is to provide a support for a windshield wiper as aforesaid whereby the weight of the wiper is removed from the motor for actuating the same, during such periods that the wiper is not in active operation.

A further object of the invention is to provide a device of the character aforesaid which is simple, durable, compact, inexpensive to manufacture, and which may be readily assembled with respect to windshields and wipers of conventional designs.

With the foregoing and other objects in view, the invention consists of the novel construction, combination and arrangement of parts as hereinafter more particularly described, and as illustrated in the accompanying drawings wherein is shown an embodiment of the invention, but it is to be understood that such description and drawings are to be taken as illustrative and that the invention is intended to be limited only by the scope of the claims hereunto appended.

In the accompanying drawings in which like numerals are employed to designate like parts throughout the same:

Figure 1 is a perspective view of a support in accordance with this invention, showing the same in association with a windshield and windshield wiper.

Figure 2 is a fragmentary section through the windshield showing the support in side elevation.

Referring to the drawings in detail, the numeral 1 designates a windshield mounted in the usual manner within a frame 2. Mounted on the outer face of the frame 2 is a housing 3 for a motor for operating a windshield wiper 4. The wiper 4 is connected with the motor in the usual manner by means of a rod 5.

The support for the windshield wiper is indicated generally at 6 and consists of a pair of end portions 7 and 8 and an intermediate portion 9. Threaded on the inner end of the end portion 7 is a button 10 which provides a finger grip. The end portions 7 and 8 are disposed in parallel, spaced relation and the intermediate portion 9 extends at right angles to the end portions 7 and 8. The end portion 8 is of materially less length than the end portion 7 and is disposed with its free end 11 opposing the outer face of the windshield 1.

The inner end portion 7 of the support slidably extends through an elongated sleeve 12 which is of materially less length than the end portion 7. The sleeve 12 is adapted to extend through an opening 3 formed in the frame 2 and is connected with the frame by means of a pair of lock nuts 14, one of which opposes the outer face of the frame 2 and the other of which opposes the inner face of the frame. The sleeve 12 is externally threaded for engagement with the nuts 14 and by manipulation of the latter the sleeve may be adjusted longitudinally with respect to the frame. This adjustment permits the support to be used with windshields of different types. Encircling the portion 7 is a coil spring 15, the respective ends of which abut the button 10 and sleeve 12.

The spring 15 normally maintains the support in operative position, in which position the end portion 8 is extended beneath the wiper 4 to support the latter and the free end 11 of the end portion 8 is adjacent the outer face of the windshield 1. When it is desired to render the support inoperative, the end portion 7 is forced through the sleeve 12 against the compression of the spring 15 until the free end 11 of the portion 8 clears the wiper 4. The support may then be rotated to the position indicated in dotted lines in Figure 1 where it will be maintained by the action of the spring 15. With the support in inoperative position, the wiper 4 is free to operate in the usual manner.

It is thought that the many advantages of a support in accordance with this invention will be readily apparent, and although the preferred embodiment is as illustrated and described, it is to be understood that various changes in the details of construction may be resorted to, so long as such changes fall within the scope of the invention as defined in the appended claims.

What I claim is:

1. A windshield wiper support adapted to be connected with a windshield frame and comprising, a rigid elongated member having an outer end portion, an inner end portion parallel thereto, and an intermediate portion disposed at right angles to said end portions, said outer end portion being adapted to extend beneath a wiper associated with the windshield, a sleeve extending through the frame and through which the inner end portion slidably extends, said inner end portion being of materially greater length than the sleeve and formed at its inner end with a finger grip, and means for adjustably connecting the sleeve with the frame.

2. In a windshield wiper support for mounting on a windshield frame, the combination of a supporting element having a horizontally disposed end portion for connection with the frame and further having a horizontally disposed end portion in spaced relation to the first named end portion for supporting the wiper, and means mounted on the first named end portion for slidably connecting the same with the frame.

3. In a windshield wiper support for mounting on a windshield frame, the combination of a sleeve for connection with the frame, and a supporting element having a horizontally disposed end portion slidably extending through the sleeve and further having a horizontally disposed end portion in spaced, parallel relation to the first named end portion for supporting the wiper.

4. In a windshield wiper support for mounting on a windshield frame, the combination of a sleeve for connection with the frame, a supporting element having a horizontally disposed end portion slidably extending through the sleeve and further having a horizontally disposed end portion in spaced, parallel relation to the first named end portion for supporting the wiper, and means for adjustably connecting the sleeve with the frame to provide for the adjustment of the wiper supporting end portion toward and from the windshield.

5. In a windshield wiper support for mounting on a windshield frame, the combination of a supporting element having a horizontally disposed end portion for connection with the frame, a finger grip on said end portion, said supporting element further having a horizontally disposed end portion in spaced, parallel relation to the first named end portion for supporting the wiper, means mounted on the first named end portion for slidably connecting the same with the frame, and a tension element bearing against said finger grip to normally force the wiper supporting end portion of the supporting element toward the windshield.

6. In a windshield wiper support for mounting on a windshield frame, the combination of a sleeve for connection with the frame, a supporting element having a horizontally disposed end portion slidably extending through the sleeve, a finger grip on said end portion, said supporting element further having a horizontally disposed end portion in spaced, parallel relation to the first named end portion for supporting the wiper, and a tension element interposed between the finger grip and sleeve to normally force the wiper supporting end portion of the supporting element toward the windshield.

7. In a windshield wiper support for mounting on a windshield frame, the combination of a sleeve for connection with the frame, a supporting element having a horizontally disposed end portion slidably extending through the sleeve, a finger grip on said end portion, said supporting element further having a horizontally disposed end portion in spaced, parallel relation to the first named end portion for supporting the wiper, a tension element interposed between the finger grip and sleeve to normally force the wiper supporting end portion of the supporting element toward the windshield, and means for adjustably connecting the sleeve with the frame to provide for the adjustment of the wiper supporting end portion of the supporting element toward and from the windshield.

In testimony whereof, I affix my signature hereto.

EDMUND H. BURKE.